United States Patent Office 3,661,958
Patented May 9, 1972

3,661,958
PROCESS FOR THE MANUFACTURE OF DIALKYL-TIN DIIODIDE FROM TIN AND ALKYL IODIDE
Mitsuo Onozuka and Kinji Iida, Fukushima-ken, Japan, assignors to Kureha Kagaku Kogyo Kabushiki Kaisha, Tokyo, Japan
Filed June 10, 1969, Ser. No. 831,878
Claims priority, application Japan, June 25, 1968, 43/43,740; Aug. 21, 1968, 43/59,206; Sept. 19, 1968, 43/67,232, 43/67,233; Sept. 24, 1968, 43/68,289; Sept. 27, 1968, 43/69,524; Oct. 2, 1968, 43/71,172; Oct. 8, 1968, 43/72,830; Oct. 15, 1968, 43/74,661, 43/74,662, 43/74,663; Oct. 18, 1968, 43/75,601
Int. Cl. C07f 7/22
U.S. Cl. 260—429.7                         13 Claims

ABSTRACT OF THE DISCLOSURE

A process for the manufacture of dialkyltin diiodides which comprises reacting metallic tin and an alkyl iodide having from 8 to 24 carbon atoms in the alkyl moiety, said alkyl iodide being present in a ratio of from 2.2 to 4.0 mols of alkyl iodide to 1.0 gr.-atom of said metallic tin, and further, said reaction being carried out in the presence of from 0.001–0.5 mols of a catalyst consisting essentially of a nitrogen-containing organic catalytic compound selected from the group consisting of a primary, secondary, and tertiary amine, a heterocyclic amine, and a lactam.

BACKGROUND OF THE INVENTION

(1) Field of the invention

Figure 1:
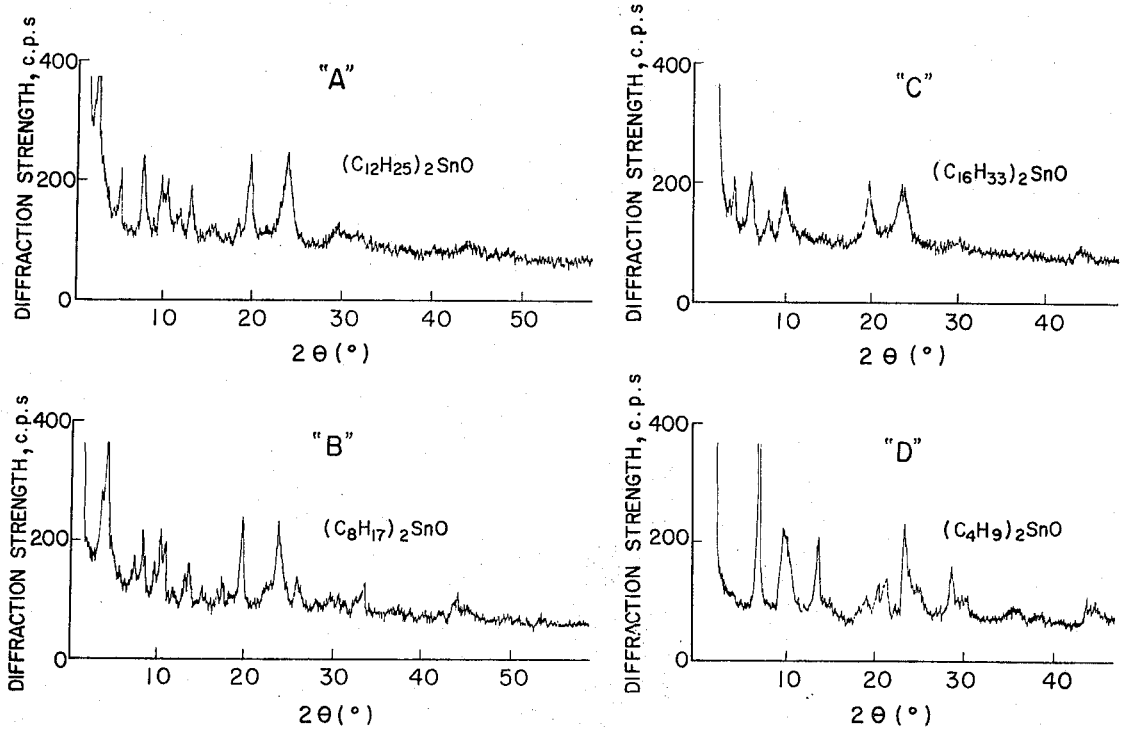
Figure 3:
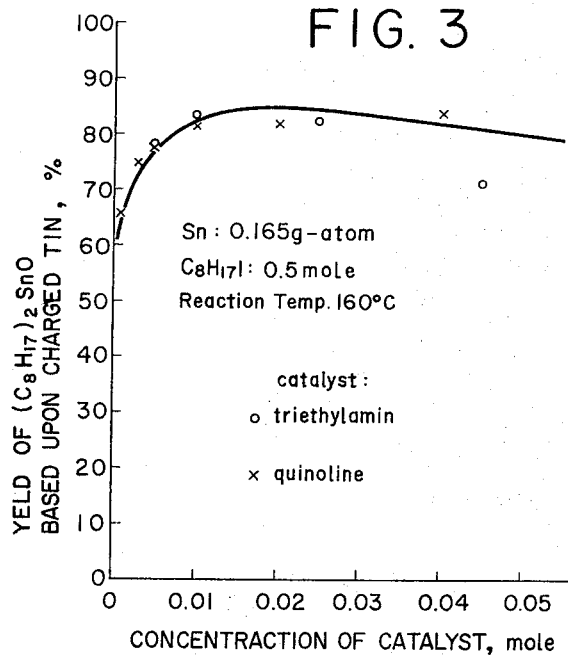

This invention relates to improvements in or relating to the process for the manufacture of dialkyltin diiodide directly from the tin and alkyl iodide, the alkyl having carbon atoms 8–24. More specifically, it relates to the process of the above kind wherein the product yield is substantially higher than that obtainable with the prior art.

(2) Description of the prior art

Organotin compounds are nowadays broadly in use in the fields of stabilizers for vinyl chloride; bactericides, fungicides and the like. Among others, the yearly consumed quantity of organotin compounds as a stabilizer is increasing more and more. In this field, dialkyltin oxide which is obtainable from dialkyltin diiodide by alkali treatment thereof has been manufactured on a large scale, for the utilization thereof as an intermediate product adapted for the synthetic manufacture of various thermal stabilizers. In consideration of such recent tendency that rigid polyvinyl chloride is broadly and tremendously used as the material for foodstuff packages, dialkyltin compounds, especially those of lesser toxicity are highly desirable to be employed as the thermal stabilizer. It is however, commonly known that the more numerous the number of alkyl carbons the lesser will be the toxicity of the dialkyltin compound. On the other hand, it has been experienced that with more numerous numbers of the alkyl carbons the yield of the product dialkyltin diiodide of the synthetic reaction will be smaller. Therefore, as a general rule the low toxic tin stabilizers such as a dioctyltin compound is rather costly in comparison with other commonly used tin stabilizers such as dibutyltin compound which means a fatal drawback in the art.

Conventional processes for the synthetic manufacture of dialkyltin diiodide may be classified into the following four methods:
(1) Grignard method;
(2) Wurtz-Fitting method;
(3) Direct synthetic method;
(4) Alkyl aluminium method;

of which methods (1) and (3) are mainly adopted for the industrial purpose.

It has been reported that when relying upon the direct synthetic process the yield of dialkyltin diiodide has a tendency decrease with the number of alkyl carbons greater than 6. For instance, Matsuda et al. reported that while dibutyltin diiodide can be porduced with a higher yield than 90% from tin and butyl iodide, that of dioctyltin diiodide will become considerably less when synthesized from tin and octyl iodide. Even when the reaction conditions were widely modified for improving the reaction rate of the tin, it was highly difficult to improve the yield of the dioctyltin diiodide product to the degree at which dibutyltin iodide was obtained, which naturally means a considerable drawback when it is intended to apply the process to industrial purposes.

It is therefore the main object of the present invention to provide a process for the synthetic manufacture of dialkyltin diiodide from tin and a corresponding alkyl iodide, with a high yield of the product and without substantially increasing the reaction temperature.

A further object is to provide an effective catalyst for carrying out the above mentioned synthetic manufacturing process.

These and further objects, features and advantages of the invention will become more apparent as the description proceeds.

SUMMARY OF THE INVENTION

According to the present invention, it is proposed to use a nitrogen-containing organic compound as the catalyst in the process of the aforementioned direct synthetic method. It is now found that the yield of dialkyltin diiodide can be selectively and amazingly improved by the use of the novel catalyst as proposed by the present invention.

Aluminium chloride, iron chloride, zinc chloride and the like could be employed as the catalyst for accelerating the reactive function of carbon-iodine bond of alkyl iodide compound. With use of such catalysts, however, the formation of olefin by virtue of the inevitably invited dehydrohalogenation will be disadvantageously encountered.

A predominant feature of the synthetic process according to the invention resides in the fact that it can be carried into effect with the use of a very small amount of the catalyst without substantially increasing the reaction temperature and within a short reaction period, the yield of the product dialyltin diiodide being nevertheless high.

An application of the catalyst as proposed by the invention, more specifically, nitrogen-containing organic compound, to an alkyl chloride or alkyl bromide-tin system for the synthetic formation of dialkyltin chloride or dialkyltin bromide would be disadvantageous and uneconomical by virtue of the incapability of improving the tin conversion rate, as well as, selectively improving the yield of dialkyltin compound when it is desired to obtain the latter as the main product. It has been found that dialkyltin compounds, especially having more than 8 alkyl carbons, cannot be obtained with high yields, when relying upon such processing mode.

It has been amazingly found that when relying upon the unique catalyst according to this invention, the synthetic reaction can be, even if the alkyl radical be in the form of a considerably long chain having 18–24 carbon atoms), effectively carried with substantially equal high product yield as in the case of shorter chain alkyls of 4–8 carbon atoms; while in the corresponding process for the direct reaction of higher alkyl iodides with tin in the presence of a conventional catalyst such as that of magnesium base or alcoholic series, the yield of the main product will abruptly drop, if the number of alkyl carbons exceeds beyond 8. It has been further found that the rate of formation of dialkyltin diiodide relative to the converted amount of tin will increase, and indeed, with an increase in the number of alkyl carbons, assuming the reaction conditions are the same. Any person skilled in the art has not yet imagined in any way that higher alkyltin iodides having 8–24 alkyl carbon atoms can be synthetically manufactured with a high yield of final product.

As the nitrogen-containing compound employable as the catalyst in the process of this invention there may be illustrated: primary, secondary, tertiary or quaternary alkylamine salt with carbon atoms 1–18; ammonium salt, nitrogen-containing organic acid salt such as ammonium acetate, ammonium benzoate, ammonium formate, ammonium oxalate or the like; aniline and its derivatives such as o-chloroaniline, p-chloroaniline; o-, m- or p-aminoaniline; N,N-dimethylaniline; N,N-diethylaniline; cyclohexylamine; o- or p-chlorocyclohexylamine; o- or p-methylcyclohexylamine; o-, m- or p-aminohexylamine; dicyclohexylamine; diphenylamine; tricyclohexylamine; triphenylamine; benzylamine; dibenzylamine; tribenzylamine; N-alkylcyclohexylamine; N-alkyl-dicyclohexylamine; N,N-dialkyl cyclohexylamine; ethylene diamine; propylene diamine; diethylene triamine; hexamethylene tetramine; phenylene diamine; phenylene triamine; naphthyl amine; naphthyl triamine; cyclohexyl diamine; cyclohexyl triamine; cyclopropylamine; cyclopentylamine; cycloheptylamine; cyclooctylamine; cyclododecylamine; 3-azo-bicyclo[3,2,2]nonane; N-cyclohexylpiperidine; dicyclopropyl)amine; di(cyclopentyl)amine; di(cycloheptyl)amine; di(cyclooctyl)amine; di(cyclododecyl)amine; S-triazine compounds such as cyanuric chloride; melamine; 2-amino-4,6-dichloro-S-triazine; 2,4 - diamino-6-chloro-S-triazine; $N^2$ - monoalkylmelamine; $N^2$ - dialkylmelamine; $N^2,N^4$-dialkylmelamine; $N^2,N^4$-tetraalkylmelamine; $N^2,N^4,N^6$-trialkylmelamine; $N^2,N^4,N^6$-hexaalkylmelamine; alkylisomelamine; $N^2$-monophenylmelamine; $N^2$-diphenylmelamine; $N^2,N^4$-diphenylmelamine; $N^2,N^4$-tetraphenylmelamine; $N^2,N^4,N^6$-triphenylmelamine; $N^2,N^4,N^6$-hexaphenylmelamine; phenylisomelamine; 1,3,5-triazocyclohexane; 1,3,5-trialkylhexahydro-S-triazine; 1,3,5-triazole; 1,3,5-triazocyclohexane and the like; lactam compounds such as α-pyrrolidinone; γ-butyrolactam; δ-valerolactam; ε-caprolactam; 2-azacyclooctanone; 2-azacyclononane; 2-azacyclodecanane; 2-azacycloundecanane and the like; carbamic acid ester compounds such as ethyl carbamate; butyl carbamate; phenyl carbamate; cyclohexyl carbamate; ethylene glycol dicarbamate and the like; pyridine; quinoline; isoquinoline; acridine; pyrrole; pyrrolidone; indole; carbazole; imidazole; pyrazol; piperidine; piperazine; oxazine; urea; hydrazine; alkylhydrazine; phenylhydrazine; guanidine; alkylguanidine; guanidinocarbonic acid; derivatives of guanidine carbamate; guanidine hydrochloride; guanidine nitrate; guanidine sulfate; guanidine phosphate; amino acid and its derivatives such as glycin; alanine; 2-, 3- or 4-aminobutyric acid; 2-, 3-, 4- or 5-aminovaleric acid; 2-, 3-, 4-, 5- or 6-aminocaproic acid and the like; further valine; norvaline; leucine; isoleucine; norleucine; serine; threonin; cystine; methionine; amino acid derivatives such as asparaginic acid; glutamic acid and the like.

When the process is carried into effect with the use of an alkyl iodide having alkyl carbons of more than 8, tertiary amines such as triethylamine tributylamine and the like; dicyclohexylamine, quinoline, γ-butrolactam and the like, show a highly effective catalytic activity.

When it is attempted to carry out the synthetic process in the presence of other nitrogen-containing compounds than those listed above, such as ammonia, ammonium derivatives such as ammonium sulfate, ammonium hydrochloride, ammonium phosphate and the like inorganic acid salts, dialkyltin compounds may be obtained, but only in poor yields.

In the synthetic production of dialkyltin diiodide from metallic tin and alkyl iodide, 2.2–4 moles of alkyl iodide may be used relative to 1 gr. atom of tin in the presence of preferably 0.001–0.5 mole of nitrogen-containing compound relative again to 1 gr. atom of tin. With a lesser amount of nitrogen-containing compound than the above specified lowest limit, it is difficult to improvide the amount of converted tin. On the contrary, with a higher amount of the nitrogen-containing compound than the above specified highest limit, not only is the catalytic activity not improved as much as desired, but also it is acknowledged that the yield of dialkyltin diiodide based upon the converted amount of tin will be disadvantageously decreased.

The reaction temperature range may preferably be between 130 and 230° C. With the use of an alkyl iodide with alkyl carbons 8, the process may preferably be carried into effect at 140–180° C. With the use of a higher alkyl iodide 12–24 alkyl carbons, the reaction can be carried out almost quantitatively and within a short period such as several hours, when processed the starting materials and the catalyst subjected to a higher temperature ranging between 180 and 200° C.

With the exception of extraordinary cases where the catalytic activity is exceptionally low, the processing temperature should not be raised beyond 200° C., even when a long chain alkyl iodide is used.

If the process is carried out at a higher temperature than 230° C., the formed dialkyltin diiodide and the material alkyl iodide may partly be discolored disadvantageously. While according to the prior technique of the direct synthesis by use of octyl iodide, the reaction is highly difficult to progress unless the reaction mixture is subjected to a higher temperature than 180° C., the process can be completely finished at 160° C. in the presence of the novel catalyst according to this invention. When a long chain alkyl iodide with 12–24 alkyl carbons, the superior catalytic activity of nitrogen-containing compounds employed in the invention over the prior catalysts can be appreciably acknowledged. With the use of conventional catalysts, and when treating higher alkyl iodides having alkyl carbons greater than 8, the tin alkylation yield is considerably poor, even when the reaction temperature should be raised to 230° C. or still higher, thus preventing high yields of dialkyltin diiodide to be realized. On the contrary, with the use of the catalyst according to this invention the dialkyltin diiodide product can be obtained with high yield by carrying out the process at 180–200° C. irrespective of the number of alkyl carbons 12–24 contained in the alkyl iodide. The fact that the alkylation of tin can be brought about at lower temperatures than 200° C. will avoid otherwise possible thermal decomposition of excessively existing alkyl iodides and assure quantitative recovery of non-reacted alkyl iodide, which means a considerable progress in the art.

Dialkyltin oxide which is obtained through hydrolysis of the product dialkyltin diiodide by alkali is used generally as an intermediate for the manufacture of thermal stabilizers for polyvinyl chloride. The thermal stabilizers having long chain dialkyl radicals synthesized from the dialkyltin oxide exhibit highly superior lubricity over conventional stabilizers such as dibutyltin, dioctyltin and the like. On the other hand, the stabilizers proposed by this invention provide polyvinyl chloride resins with highly superior transparency over that obtainable with those of metallic soap origin, and have a superior compatibility with polyvinyl chloride resin.

The compounds capable of synthetic manufacturing according to the novel teaching of this invention are among others: dioctyltin oxide; didecyltin oxide; didodecyltin oxide; ditetradecyltin oxide; dihexadecyltin oxide; dioctadecyltin oxide; dieicosyltin oxide; didocosyltin oxide; ditetracosyltin oxide.

The toxicity of the higher alkyltin compounds obtainable through the process according to this invention is found as becoming less the longer the chain length of the alkyl radical is, when assuming the number of alkyl substituent groups being same. Those skilled in the art have directed substantially no attention the practical employment of such organotin stabilizers as having higher alkyl carbons than 8, by virtue of the fact that long chain dialkyltin compounds could not be synthesized with high yields. Especially, as for the toxicity of these compounds, those skilled in the art have placed a limit in their study to that of dioctyltin compounds thus no report has been made of the toxicity of still longer chain dialkyltin compounds beginning from dilauryltin compound.

Since we have succeeded to manufacture the longer chain dialkyltin compounds at higher yields than that obtainable by prior art on dioctyltin compound, profound practical tests have been made on the various performances as well as toxicity of the thermal stabilizers which are synthetically manufactured from said longer chain dialkyltin oxides and destined as such for polyvinyl chloride resin.

As a result, it has been ascertained with the negative substituent structure of the tin compound stabilizers being fixed, the thermal stabilizing effect of dialkyltin compounds having 16 or lesser alkyl carbons is substantially similar to that of dioctyltin compound, there being however a slight tendency of reduction in the thermal stabilizing effect. Starting from dioctadecyltin stabilizer towards higher alkyltin compounds, a tendency of decrease in thermal stability is clearly acknowledged. On the other hand, the lubricity increases substantially with increase of the number of alkyl carbons. Longer chain alkyltin stabilizers other than dioctadecyltin compound when added a decrease in the transparency of polyvinyl chloride mouldings to a slight degree. Tests were performed on the acute toxicity, on the one hand, and the effect on the number of red blood cells caused by repeated oral doses of several compounds obtained from the products of the proposed synthetic process. The results are shown in the following Tables 1 and 2. As seen, the toxicity decreases with increase of alkyl carbons contained.

TABLE 1

Acute toxicity of several dialkyltin compounds on mice through oral dosis

| Compounds: | $LD_{50}$ (mg./kgs.) |
|---|---|
| $(C_4H_9)_2SnO$ | Below 1,000 |
| $(C_8H_{17})_2SnO$ | Over 8,000 |
| $(C_{12}H_{25})_2SnO$ | Over 17,000 |
| $(C_{16}H_{33})_2SnO$ | Over 20,000 |
| $(C_4H_9)_2SnCl_2$ | 320–1,000 |
| $(C_8H_{17})_2SnCl_2$ | Over 4,500 |
| $(C_{12}H_{25})_2SnCl_2$ | 14,000–17,000 |
| $(C_{16}H_{33})_2SnCl_2$ | Over 20,000 |

REMARKS

Tests were made on female mice divided into 6 groups each consisting of 7 animals of ICR-origin.

Each compound upon mixing with olive oil was orally dosed by means of probe.

TABLE 2.—TOXICITY TESTS OF SEVERAL DIALKYLTIN DICHLORIDES ON RABBITS

[Percentages given show respective variations in the number of red blood cells and in the quantity of hemoglobin, resulted during 6 weeks by oral daily doses of 0.2 g./kg. of dialkyltin dichloride five times a week]

| | Compounds | Before test | 1 | 2 | 3 | 4 | 5 | 6 |
|---|---|---|---|---|---|---|---|---|
| Rate of change in number of red blood cells. | $(C_8H_{17})_2SnCl_2$ | 0 | −9.3 | −24.5 | −7.6 | −12.6 | −12.9 | −6.1 |
| | | 0 | −4.5 | −25.6 | −19.1 | −23.4 | −24.2 | −15.3 |
| | $(C_{12}H_{25})_2SnCl_2$ | 0 | +7.0 | −4.9 | +10.5 | +7.7 | −2.7 | +4.1 |
| | | 0 | −4.5 | −2.1 | +12.7 | +12.8 | −1.9 | +3.2 |
| Rate of change in quantity of hemaglobin. | $(C_8H_{17})_2SnCl_2$ | 0 | −5.9 | −15.2 | −5.9 | −16.4 | −8.2 | −9.4 |
| | | 0 | −6.5 | −11.8 | −17.2 | −17.2 | −17.2 | −15.1 |
| | $(C_{12}H_{25})_2SnCl_2$ | 0 | +6.0 | −3.6 | +7.2 | +3.6 | −9.7 | ±0 |
| | | 0 | +9.9 | +6.6 | +14.5 | +9.2 | +7.2 | +11.8 |

In the following, several preferred numerical examples of the process according to the invention will be given for better understanding of the invention, in addition to several reference examples showing corresponding prior art process.

EXAMPLE 1

Finely pulverized metallic tin, purity being over 99.9%, was charged upon passage through a 50-mesh screen and together with dodecyl iodide (B.P. 128–134° C./2 mm.) and catalyst, into a steel autoclave, containing capacity: 200 ml. and fitted an agitator of the electromagnetically driven type, of 300 r.p.m. Main reaction conditions are given in the following Table 3.

The thus charged autoclave was dipped into a heated oil bath for initiating the reaction. Then, the autoclave was taken out from the bath, the sedimented product was filtered off, and non-reacted excess quantity of dodecyl iodide was recovered in vacuo (0.5 mm. Hg). The reacted product was treated with an aqueous caustic soda solution so as to transform it into didodecyltin oxide. More specifically, the reaction product was gradually supplied dropwise to the caustic soda solution, concentration being about 20% and the bath being kept at 80–90° C., for about 2 hours under agitation for carrying out the hydrolysis. The supernatant liquid was removed from the hydrolysis system through decantation. The residual was then subjected to repeated water washing, dehydrated, and washed two times with acetone for carefully removing impurities comprising mono- or tridecyltin oxide through dissolution and extraction and thus refining the crude main product: didodecyltin oxide. In this way, the desired product was obtained with high yield.

An X-ray diffraction of the thus obtained didodecyltin oxide is shown in FIG. 1 at A.

In this figure, the ordinate represents strength in c.p.s., the abscissa: 2θ degrees; the measuring conditions: Ni/Cu; Kα line; 35kv., 15 ma.; 20/min.; time constant: 2 sec.

Figure 2:
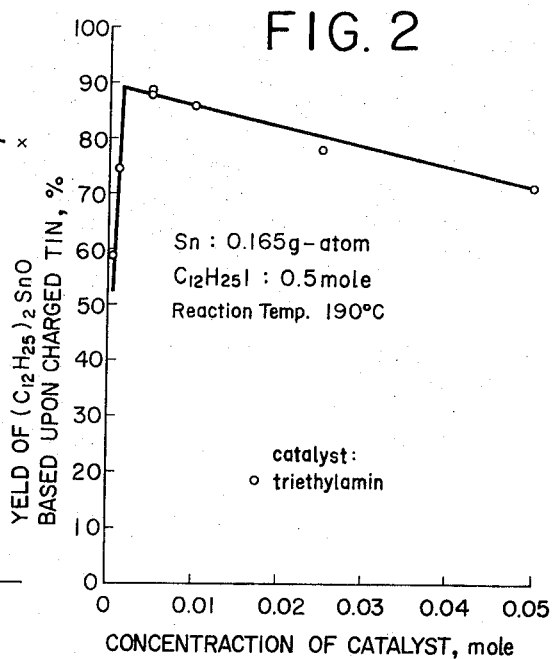
Figure 6:
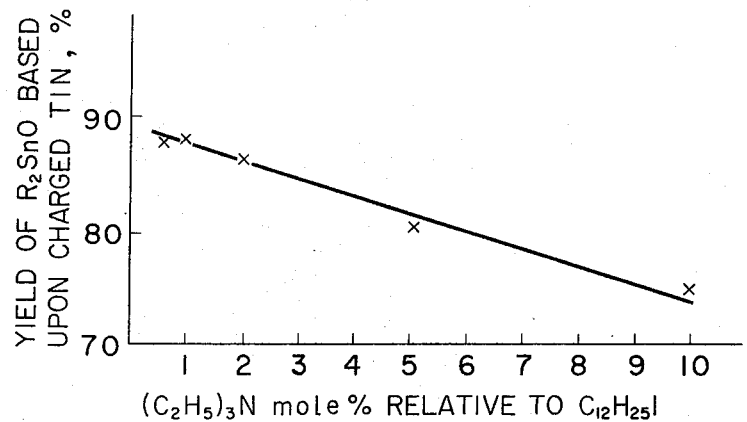

From several selected data in Table 3, a yield curve of the product didodecyltin oxide based upon the charged tin is plotted in FIG. 2 against the used quantity of the catalyst triethylamin. It will be clear from these data that the used quantity of the catalyst resides in a range of 0.001–0.5 mole, preferably 0.005–0.1 mole for performing the synthetic formation of didodecyltin component with selectively increased high yield. The yields of didodecyltin oxide expressed in percent in the Table 3 were determined based upon respective amounts of tin charge.

TABLE 3

| | C₁₂H₂₅I | | Sn | | Catalyst | | Reaction temperature, °C | Reaction period, hours | Tin conversion rate, percent | (C₁₂H₂₅)₂SnO (percent) |
|---|---|---|---|---|---|---|---|---|---|---|
| | Mole | Grams | Gram-atom | Grams | | Grams | | | | |
| Comparative experiment (blank): | | | | | | | | | | |
| 1 | 0.5 | 148 | 0.165 | 19.6 | | | 200 | 10 | Trace | Trace |
| Comparative experiment (direct synthetic process): | | | | | | | | | | |
| 2 | 0.3 | 88.9 | 0.1 | 11.9 | C₄H₉OH / Mg | 2.7 / 0.035 | 190 | 3 | 26.1 | 18.8 |
| 3 | 0.5 | 148 | 0.165 | 19.6 | C₄H₉OH / Mg | 4.5 / 0.059 | 200 | 7 | 74.0 | 60.3 |
| 4 | (C₁₂H₂₅Cl) (0.5 mole) | | 0.165 | 19.6 | (C₂H₅)₃N / I₂ | 10 / 5 | 200 | 10 | 13.4 | 7.8 |
| Experimental case: | | | | | | | | | | |
| 1 | 0.5 | 148 | 0.165 | 19.6 | (C₂H₅)₃N (0.025 mole) | 2.5 | 180 | 3 | 100 | 78.7 |
| 2 | 0.5 | 148 | 0.165 | 19.6 | (C₂H₅)₃N (0.05 mole) | 5.0 | 160 | 3 | 83.2 | 62.2 |
| 3 | 0.5 | 148 | 0.165 | 19.6 | (C₂H₅)₃N (0.5 mole) | 5.0 | 170 | 3 | 95.4 | 71.8 |
| 4 | 0.5 | 148 | 0.165 | 19.6 | (C₂H₅)₃N (0.01 mole) | 1.0 | 180 | 3 | 99.5 | 85.4 |
| 5 | 0.5 | 148 | 0.165 | 19.6 | (C₂H₅)₃N (0.005 mole) | 0.5 | 190 | 3 | 100 | 88.3 |
| 6 | 0.5 | 148 | 0.165 | 19.6 | (C₂H₅)₃N (0.003 mole) | 0.3 | 190 | 5 | 100 | 88.1 |
| 7 | 0.5 | 148 | 0.165 | 19.6 | (C₂H₅)₃N (0.001 mole) | 0.1 | 190 | 3 | 97.5 | 74.4 |
| 8 | 0.5 | 148 | 0.165 | 19.6 | (C₂H₅)₃N (0.0005 mole) | 0.05 | 190 | 3 | 89.3 | 58.8 |
| | | | | | | Moles | | | | |
| 9 | 0.5 | 148 | 0.165 | 19.6 | (C₂H₅)₃N | 0.001 | 190 | 0.5 | 80.6 | 58.2 |
| 10 | 0.5 | 148 | 0.165 | 19.6 | (C₂H₅)₃N | 0.001 | 190 | 1 | 89.8 | 65.4 |
| 11 | 0.5 | 148 | 0.165 | 19.6 | (C₂H₅)₃N | 0.001 | 190 | 2 | 92.9 | 67.9 |
| 12 | 0.5 | 148 | 0.165 | 19.6 | (C₂H₅)₃N | 0.001 | 190 | 5 | 95.9 | 63.6 |
| 13 | 0.5 | 148 | 0.165 | 19.6 | (C₂H₅)₃N | 0.001 | 190 | 8 | 98.0 | 65.4 |
| 14 | 0.5 | 148 | 0.165 | 19.6 | C₄H₉NH₂ | 0.01 | 190 | 3 | 100 | 83.2 |
| 15 | 0.5 | 148 | 0.165 | 19.6 | (C₄H₉)₂NH | 0.01 | 190 | 3 | 100 | 79.2 |
| 16 | 0.5 | 148 | 0.165 | 19.6 | (C₄H₉)₃N | 0.01 | 190 | 3 | 100 | 86.0 |
| 17 | 0.5 | 148 | 0.165 | 19.6 | (CH₃)₃N | 0.01 | 190 | 3 | 94.9 | 70.4 |
| 18 | 0.5 | 148 | 0.165 | 19.6 | (C₂H₅)₃N | 0.01 | 180 | 3 | 99.5 | 85.4 |
| 19 | 0.5 | 148 | 0.165 | 19.6 | (C₈H₁₇)₃N | 0.01 | 190 | 3 | 100 | 80.5 |
| 20 | 0.5 | 148 | 0.165 | 19.6 | 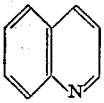 | 0.01 | 190 | 3 | 95.4 | 84.5 |
| 21 | 0.5 | 148 | 0.165 | 19.6 | Same as above | 0.025 | 190 | 3 | 100 | 82.5 |
| 22 | 0.5 | 148 | 0.165 | 19.6 | ......do...... | 0.05 | 190 | 3 | 100 | 76.3 |
| 23 | 0.5 | 148 | 0.165 | 19.6 | 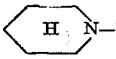 | 0.01 | 190 | 3 | 96.9 | 83.6 |
| 24 | 0.5 | 148 | 0.165 | 19.6 | 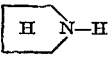 | 0.01 | 190 | 3 | 93.9 | 72.4 |
| 25 | 0.5 | 148 | 0.165 | 19.6 | 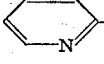 | 0.01 | 190 | 6 | 94.2 | 73.6 |
| 26 | 0.5 | 148 | 0.165 | 19.6 | 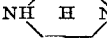 | 0.01 | 190 | 3 | 99.0 | 82.9 |
| 27 | 0.5 | 148 | 0.165 | 19.6 | 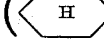 | 0.01 | 190 | 3 | 100 | 88.7 |
| 28 | 0.5 | 148 | 0.165 | 19.6 | 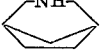 | 0.01 | 190 | 3 | 100 | 79.6 |
| 29 | 0.5 | 148 | 0.165 | 19.6 | Cyanuric chloride | 0.01 | 190 | 3 | 99.0 | 68.2 |
| 30 | 0.5 | 148 | 0.165 | 19.6 | ε-Caprolactam | 0.01 | 190 | 3 | 100 | 70.5 |
| 31 | 0.5 | 148 | 0.165 | 19.6 | Diphenylcarbazone | 0.01 | 190 | 3 | 99.0 | 77.2 |
| 32 | 0.5 | 148 | 0.165 | 19.6 | γ-Butyrolactam | 0.01 | 190 | 3 | 99.5 | 82.2 |
| 33 | 0.5 | 148 | 0.165 | 19.6 | 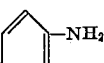 | 0.01 | 190 | 3 | 87.8 | 69.9 |
| 34 | 0.5 | 148 | 0.165 | 19.6 | H₂N—COOC₂H₅ | 0.01 | 190 | 3 | 97.5 | 79.2 |
| 35 | 0.5 | 148 | 0.165 | 19.6 | NH₂NH₂H₂O | 0.01 | 190 | 3 | 97.5 | 65.4 |
| 36 | 0.5 | 148 | 0.165 | 19.6 | NH=C(NH₂)₂ | 0.01 | 190 | 3 | 98.0 | 67.4 |
| 37 | 0.5 | 148 | 0.165 | 19.6 | (CH₂)₆N₄ | 0.01 | 190 | 3 | 94.9 | 72.6 |
| 38 | 0.5 | 148 | 0.165 | 19.6 | (CH₃)₂N—CH₂ / (CH₃)₂N—CH₂ | 0.01 | 190 | 3 | 100 | 77.7 |
| 39 | 0.5 | 148 | 0.165 | 19.6 | Piperazine | 0.01 | 190 | 3 | 99.0 | 83.7 |

TABLE 3—Continued

| | $C_{12}H_{25}I$ | | Sn | | Catalyst | | Reaction temperature, °C. | Reaction period, hours | Tin conversion rate, percent | $(C_{12}H_{25})_2SnO$ (percent) |
|---|---|---|---|---|---|---|---|---|---|---|
| | Mole | Grams | Gram-atom | Grams | | Grams | | | | |
| 40 | 0.5 | 148 | 0.165 | 19.6 | $(C_4H_9)_2N-\langle\text{H}\rangle$ | 0.01 | 190 | 3 | 100 | 87.9 |
| 41 | 0.5 | 148 | 0.165 | 19.6 | Serine | 0.03 | 190 | 3 | 100 | 63.7 |
| 42 | 0.5 | 148 | 0.165 | 19.6 | γ-Butyrolactam | 0.01 | 190 | 3 | 99.4 | 85.8 |
| 43 | 0.5 | 148 | 0.165 | 19.6 | 3-azobicyclo [3,2,2]nonane | 0.01 | 190 | 3 | 100 | 79.6 |
| 44 | 0.5 | 148 | 0.165 | 19.6 | $\langle\text{benzene}\rangle-NH_2$ | 0.01 | 190 | 3 | 94.4 | 73.6 |
| 45 | 0.5 | 148 | 0.165 | 19.6 | Hexamethylphosphoramide | 0.01 | 190 | 3 | 97.4 | 79.1 |
| 46 | 0.5 | 148 | 0.165 | 19.6 | Benzylamine | 0.01 | 190 | 3 | 99.0 | 76.2 |

EXAMPLE 2

Pulverized metallic tin, purity over 99.9% and passed through a 60-mesh sieve, octyl iodide (B.P. 76–80° C./4 mm. Hg), catalyzer and the like were charged as shown in the following Table 4, and the reaction mixture was treated as before.

Without use of the catalyzer, the rate of tin conversion amounted only to several percents, and therefore it can be concluded that there was practically no progress of the reaction in the desired sense (see, Comparative Case 5).

In the Table 4, several further cases of comparative experiments wherein a conventional catalyzer, $$C_8H_{17}OH-Mg$$

was used are enlisted. These experiments were carried out naturally according to the direct synthetic process. As seen, the product yield will be reduced if the reaction temperature should not be increased to a higher range as of 180–190° C. Even if a high rate of tin conversion should be attained, it will highly difficult to obtain a higher yield of the product dioctyltin oxide than 80%.

Although in the comparative cases 6–8, octyl iodide was used as high as four times (in moles) relative to metallic tin in order to improve the conversion rate thereof, the recovery rate of octyl iodide amounted to about 80% which means a disadvantageously low value and resulted in an unbearable production cost increase.

On contrary, our experimental cases 48 and 49, the product dioctyltin oxide was produced at a very high yield such as 80–85%, and it was found that the tin conversion rate was substantially quantitative, even when the used quantity of octyl iodide was three times in moles relative to the tin charged and even when the reaction temperature was adjusted to a lower value such as 160° C. As a further advantageous feature of the invention, excess amount of octyl iodide as supplied could be substantially recovered. An X-ray diffraction curve of dioctyltin oxide is shown in FIG. 1 at B.

TABLE 4

| | $C_8H_{17}I$, mole | Sn, gram-atom | Catalyst | Reaction temp., °C. | Reaction period, hours | Tin conversion rate, percent | $(C_8H_{17})_2SnO$, percent |
|---|---|---|---|---|---|---|---|
| Experimental case: | | | | | | | |
| 47 | 0.5 | 0.165 | $(C_2H_5)_3N$ 0.05 mole | 160 | 2 | 89.3 | 71.0 |
| 48 | 0.5 | 0.165 | $(C_2H_5)_3N$ 0.025 mole | 160 | 3 | 100 | 82.5 |
| 49 | 0.5 | 0.165 | $(C_2H_5)_3N$ 0.01 mole | 160 | 3 | 98.5 | 83.4 |
| 50 | 0.5 | 0.165 | quinoline 0.025 mole | 160 | 3 | 100 | 80.0 |
| 51 | 0.5 | 0.165 | $NH_2CH_2CH_2-NH_2$ 0.02 mole | 160 | 5 | 100 | 74.5 |
| 52 | 0.5 | 0.165 | p-Phenylene diamine 0.02 mole | 160 | 5 | 96.5 | 78.1 |
| 53 | 0.5 | 0.165 | $\langle H\rangle-NH_2$ 0.025 mole | 160 | 5 | 94.1 | 70.8 |
| 54 | 0.5 | 0.165 | $\langle H\rangle-NH-C_2H_5$ 0.025 mole | 160 | 3 | 100 | 88.0 |
| 55 | 0.5 | 0.165 | $N^2, N^4, N^6$-triethylenemelamine 0.02 mole | 160 | 3 | — | 81.8 |
| 56 | 0.5 | 0.165 | Cyclopentylamine 0.02 mole | 160 | 3 | 95.8 | 79.5 |
| 57 | 0.5 | 0.165 | Dicyclopentylamine 0.02 mole | 160 | 3 | 98.7 | 83.0 |
| 58 | 0.5 | 0.165 | γ-butyrolactam 0.025 mole | 160 | 5 | 100 | 86.8 |
| 59 | 0.5 | 0.165 | ε-caprolactam 0.025 mole | 160 | 5 | 100 | 81.6 |
| 60 | 0.5 | 0.165 | Ethylene glycol dicarbamate 0.02 mole | 160 | 3 | 100 | 82.7 |

TABLE 4—Continued

| | C₈H₁₇I, mole | Sn, gram-atom | Catalyst | Reaction temp., °C. | Reaction period, hours | Tin conversion rate, percent | (C₈H₁₇)₂SnO, percent |
|---|---|---|---|---|---|---|---|
| 61 | 0.5 | 0.165 | (C₆H₁₁)₂NH (0.01 mole) | 180 | 3 | 100 | 81.4 |
| 62 | 0.5 | 0.165 | (C₆H₁₁)₂NH (0.005 mole) | 180 | 3 | 99 | 78 |
| 63 | 0.5 | 0.165 | (C₆H₁₁)₂NH (0.003 mole) | 180 | 3 | 99 | 74.7 |
| 64 | 0.5 | 0.165 | (C₆H₁₁)₂NH (0.001 mole) | 180 | 3 | 95.4 | 66.4 |
| 65 | 0.5 | 0.165 | (C₆H₁₁)₂NH (0.02 mole) | 180 | 2 | 100 | 81.9 |
| 66 | 0.5 | 0.165 | (C₆H₁₁)₂NH (0.04 mole) | 180 | 3 | 100 | 84.4 |
| 67 | 0.5 | 0.165 | (C₆H₁₁)₂NH (0.057) | 180 | 3 | 100 | 79 |
| Comparative Example: Blank 5 | 0.5 | 0.165 | | 160 | 3 | 1 | Trace |
| Direct syn. process: 6 | 0.44 | 0.1 | C₈H₁₇OH¹, Mg² | 190 | 3 | 92.4 | 74 |
| 7 | 0.44 | 0.1 | C₈H₁₇OH¹, Mg² | 190 | 4 | 96.8 | 69.3 |
| 8 | 0.44 | 0.1 | C₈H₁₇OH¹, Mg² | 180 | 3 | 53.4 | 40.8 |

¹ 3.2 grams.
² 0.035 gram.

Figure 5:
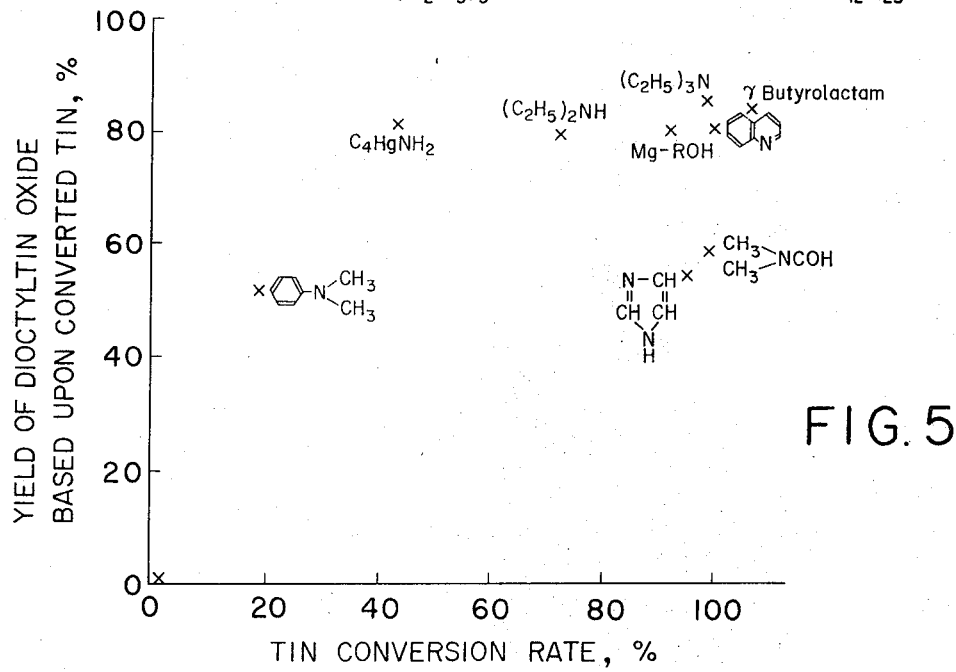

In FIG. 5 a chart is shown wherein several yields of dioctyltin oxide are plotted the conversion rate of metallic tin. These data were picked up from several representative experiments shown in the foregoing Table 4. Various different catalyzers, or more specifically triethylamine, quinoline, dicyclohexylamine, γ-butyrolactam, N-ethylcyclohexylamine and the like as used in the process wherein octyl iodide and metallic tin were reacted with each other in the presence of any one of these proposed catalyzers, showed substantial superiority over prior known catalysts such as those of the magnesium-alcohol system.

EXAMPLE 3

Figure 4:
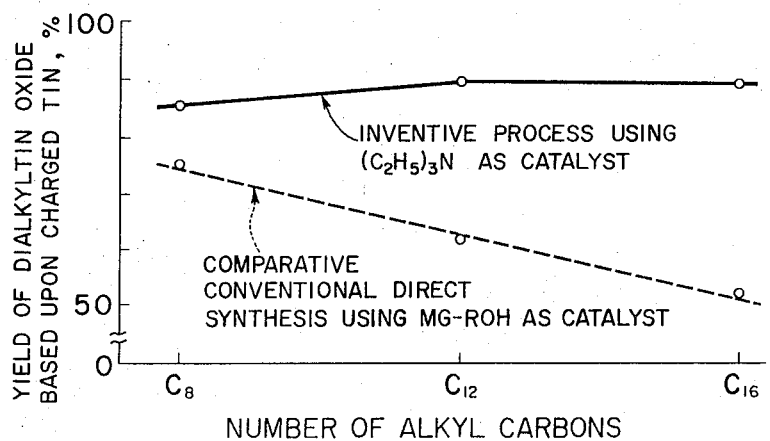

Pulverized metallic tin, purity over 99.9%, passed through a 60-mesh screen, hexadecyltin iodide, B.P. 217–222° C./20 mm. Hg, and catalyzer were charged as shown in the following Table 5, and treated as before. In this table, comparative experiments 9–11 are also shown wherein conventional catalyzers were used. In these reference cases, dialkyltin oxide was prepared only at maximum 50% yield even when considerably severe reaction conditions were employed. It was found that with longer alkyl chain, the yield of dialkyltin oxide decreased rather abruptly. In this respect, reference should be had to FIG. 4.

From the results shown in Table 5, superior characteristics of the catalyzers proposed by the invention can be clearly understood. An X-ray diffraction of dihexadecyltin oxide.

TABLE 5

| | RI | Sn, gram-atom | Catalyst | Reaction temp., °C. | Reaction period, hours | Tin conversion rate, percent | R₂SnO, percent |
|---|---|---|---|---|---|---|---|
| Comparative Example (Direct syn. process): | | | | | | | |
| 9 | C₁₆H₃₃I (0.5 mole) | 0.165 | C₄H₉OH¹, Mg² | 200 | 5 | 54 | 50 |
| 10 | C₁₈H₃₇I (0.5 mole) | 0.165 | C₁₈H₃₇OH³, Mg² | 190 | 5 | 13 | 9.2 |
| 11 | C₂₂H₄₅I (0.5 mole) | 0.165 | C₄H₉OH⁴, Mg² | 190 | 5 | Trace | Trace |
| Experimental case: | | | | | | | |
| 68 | C₁₆H₃₃I (0.5 mole) | 0.165 | (C₂H₅)₃N (0.005 mole) | 190 | 3 | 99.5 | 88 |
| 69 | C₁₆H₃₃I (0.5 mole) | 0.165 | (C₆H₁₁)₂NH (0.01 mole) | 190 | 3 | 100 | 88.4 |

TABLE 5—Continued

| | RI | Sn, gram-atom | Catalyst | Reaction temp., °C | Reaction period, hours | Tin conversion rate, percent | $R_2SnO$, percent |
|---|---|---|---|---|---|---|---|
| 70 | $C_{16}H_{33}I$ 0.5 mole | 0.165 | 3-azo-bicyclo[3,2,2]nonane 0.01 mole | 190 | 3 | 100 | 80.4 |
| 71 | $C_{18}H_{37}I$ 0.5 mole | 0.165 | $(C_2H_5)_3N$ 0.005 mole | 190 | 3 | 98 | 87.7 |
| 72 | $C_{18}H_{37}I$ 0.5 mole | 0.165 | Quinoline 0.005 mole | 190 | 3 | 99 | 85.4 |
| 73 | $C_{22}H_{45}I$ 0.5 mole | 0.165 | $(C_2H_5)_3N$ 0.005 mole | 190 | 3 | 99 | 89 |

[1] 5.3 grams.
[2] 0.06 gram.
[3] 15 grams.
[4] 6.2 grams.

EXAMPLE 4

Experiments were made substantially as before for carrying out the alkylation of metallic tin, yet within a specifically selected reaction temperature range shown in the following Table 6. The reaction conditions were adjusted so as to let the reaction of tin progress substantially quantitatively, and then the respective yields of dialkyltin component were compared. It was found the reaction temperature has nothing to do with the product yield. The reaction period varies in function with reaction temperature. In the experiment-78 shown in the last line of the Table 6, the product didodecyltin oxide was found slightly decolored to red brown. Thus, it is concluded that a reaction temperature higher than 230° C. is not recommendable.

TABLE 7.—RELATIONSHIP BETWEEN THE CHARGING RATIO: RI/Sn AND THE YIELD OF THE PRODUCT: DIOCTADECYLTIN OXIDE

| | | | | |
|---|---|---|---|---|
| RI/Sn, mole/gram-atom | 2.2/1 | 2.5/1 | 3.0/1 | 3.5/1 |
| $C_{18}H_{37}$, I, mole | 0.44 | 0.41 | 0.50 | 0.58 |
| Sn, gram-atom | 0.20 | 0.165 | 0.165 | 0.165 |
| $(C_2H_5)_3N$, mole | 0.006 | 0.005 | 0.005 | 0.005 |
| Reaction temperature, °C | 190 | 190 | 190 | 190 |
| Reaction period, hrs | 5 | 3 | 3 | 3 |
| Tin conversion rate, percent | 79.7 | 85.4 | 99.7 | 99.8 |
| Ratio of dioctadecyltin oxide to charged metallic tin | 69.2 | 79.4 | 88.0 | 88.3 |

It can be concluded from the results shown in the foregoing Table 7 that the charging ratio of alkyl iodide to iodide to metallic tin resides preferably within the range 2.5–3.5. It would be thus unnecessary to use alkyl iodide more than 4 moles.

TABLE 6

| | $C_{12}H_{25}I$, mole | Sn, gram-atom | $(C_2H_5)_3N$, mole | Reaction temp., °C | Reaction period, hours | Tin conversion rate, percent | $(C_{12}H_{25})_2SnO$, percent |
|---|---|---|---|---|---|---|---|
| Experimental case: | | | | | | | |
| 74 | 0.5 | 0.165 | 0.01 | 160 | 10 | 99.3 | 86.8 |
| 75 | 0.5 | 0.165 | 0.01 | 170 | 5 | 99.8 | 87.5 |
| 76 | 0.5 | 0.165 | 0.01 | 180 | 3 | 99.5 | 85.4 |
| 77 | 0.5 | 0.165 | 0.01 | 190 | 3 | 100 | 88.3 |
| 78 | 0.5 | 0.165 | 0.01 | 230 | 2 | 99.6 | 87.7 |

EXAMPLE 5

Dioctadecyltin compound was synthetically prepared as in the similar way to Example 1. With various and different charging ratios of octadecyl iodide to metallic tin as shown in the following Table 7, the higher the excessive quantity of alkyl iodide, the yield of dioctadecyltin oxide will become also higher. Under these conditions, the reaction period can be reduced correspondingly at the same time. Therefore, it can be concluded that the charging rate of octadecyl iodide, as well as the concentration of the catalyst does influence substantially the product yield.

REFERENCE EXAMPLE

Metallic tin, purity over 99.9% and passed through a 60-mesh screen, butyl iodide, B.P. 129–131° C. and catalyzer were charged as shown in the following Table 8 into a steel autoclave, capacity 200 ml., fitted with an electromagnetic agitator, and the charged autoclave was dipped in a heated oil bath as before for initiating the reaction. Upon completion of the reaction, the sedimented reaction product was filtered off, and excess non-reacted butyl iodide was recovered under reduced pressure, about 100 mm. Hg. The raw product was then subjected to a rectification and a distillate fraction, B.P. 146–148° C./5 mm. Hg, was obtained which was found to comprise substantially of dibutyltin iodide upon analyzed.

The thus obtained substance was fed dropwise to a 20% alkali solution, 80–90° C., under agitation, and heated for about 2 hours for hydrolysis and water-cooled. The sedimented products were washed several times with water, and then repeatedly with methanol. In this way, monoalkyltin and trialkyltin compounds as byproducts were removed through dissolving. The residual was filtered and dried. The yield of the product dibutyltin oxide is shown in the following Table 8. An X-ray diffraction of dibutyltin oxide is shown in FIG. 1 at D.

TABLE 8

| | $C_4H_9I$, mole | Sn, gram-atom | Catalyst | Reaction temp., °C. | Reaction period, hours | Tin conversion rate, percent | $(C_4H_9)_2SnO$, percent |
|---|---|---|---|---|---|---|---|
| Reference experiment: | | | | | | | |
| 1 | 1.0 | 0.33 | | 160 | 2 | 16.3 | 11.9 |
| 2 | 1.6 | 0.50 | $C_4H_9OH$, 7.7 g.; Mg, 0.17 g | 135 | 3 | 100 | 87 |
| 3 | ¹1.0 | 0.33 | $(C_2H_5)_3N$, 0.1 mole; $I_2$, 0.02 mole | 190 | 4 | 52.8 | 16.4 |
| 4 | ¹1.0 | 0.33 | ....do.... | 200 | 4 | 72.5 | 21.8 |
| Consulting experiment: | | | | | | | |
| 1 | 1.0 | 0.33 | $(C_2H_5)_3N$, 0.1 mole | 160 | 2 | 100 | 72.8 |
| 2 | 1.0 | 0.33 | $C_4H_9NH_2$, 0.1 mole | 160 | 2 | 100 | 85.8 |
| 3 | 1.0 | 0.33 |  0.1 mole | 160 | 2 | 99 | 48.6 |
| 4 | 1.0 | 0.33 | (pyridine structure) 0.1 mole | 160 | | 82.4 | 50.9 |

¹ $C_4H_9Cl$.

The production yield realized in Consulting Experiment-1 provides no substantial advantage when comparing with that obtainable in a comparative conventional direct process wherein the known Mg-butanol is used. It will be thus clear that use of nitrogen-containing compounds as catalyst for the synthetic preparation of dialkyltin diiodide from metallic tin and alkyl iodide will provide no substantial advantage over the comparative conventional process if the iodide should have four or less carbon atoms in the alkyl group.

The embodiments of the invention in which an exclusive property or privilege is claimed are defined as follows:

1. A process for the manufacture of dialkyltin diiodides which comprises reacting metallic tin and an alkyl iodide having from 8 to 24 carbon atoms in the alkyl moiety, said alkyl iodide being present in a ratio of from 2.2 to 4.0 mols of alkyl iodide to 1.0 gr.-atom of said metallic tin, and further, said reaction being carried out in the presence of from 0.001–0.5 mols of a catalyst consisting essentially of a nitrogen-containing organic catalytic compound selected from the group consisting of a primary, secondary, and tertiary amine, a heterocyclic amine, and a lactam.

2. The process of claim 1, wherein said amine is a compound of the formula:

$$X_n-N-Y_{(3-n)}$$

wherein X represents a member selected from the group consisting of a cyclohexyl group, a substituted cyclohexyl group, a phenyl group, a substituted phenyl group, a benzyl group, a substituted benzyl group, a hexahydrobenzyl group, and a substituted hexahydrobenzyl group; Y represents a member selected from the group consisting of a hydrogen atom and an alkyl group of from 1 to 8 carbon atoms, when X represents a member selected from the group consisting of a cyclohexyl group, a substituted cyclohexyl group, a benzyl group, and a substituted benzyl group; n being an integer which satisfies the expression:

$$3 \geq n \geq 1$$

3. The process of claim 1, wherein said primary, secondary, or tertiary amine is an amino acid compound.

4. The process of claim 1, wherein said amine is a member selected from the group consisting of a primary, secondary, or tertiary alkylamine, N,N-dimethylformamide, aniline, N,N-dimethylaniline, and pyridine.

5. A process for the manufacture of dialkyltin diiodides which comprises reacting metallic tin and an alkyl iodide having from 8 to 24 carbon atoms in the alkyl moiety, said alkyl iodide being present in a ratio of from 2.2 to 4 moles of alkyl iodide to 1 gr.-atom of said metallic tin, and further, said reaction being carried out in the presence of from 0.001–0.5 moles of a catalyst consisting essentially of a nitrogen-containing organic catalytic compound.

6. The process of claim 1, wherein said process is carried out at a temperature of from 130–230° C.

7. The process of claim 1, wherein said nitrogen-containing organic compound is S-triazine.

8. The process of claim 1, wherein said nitrogen-containing organic catalytic compound is piperazine.

9. The process of claim 1, wherein said nitrogen-containing organic catalytic compound is a lactam.

10. The process of claim 1, wherein said nitrogen-containing organic catalytic compound is a hydrazine compound.

11. The process of claim 1, wherein said nitrogen-containing organic catalytic compound is a guanidine compound.

12. The process of claim 6, wherein said temperature ranges from 140°–180° C.

13. The process of claim 1, wherein said alkyl iodide contains an alkyl group of from 12–24 carbon atoms and said temperature ranges from 180°–200° C.

References Cited

UNITED STATES PATENTS

| | | | |
|---|---|---|---|
| 3,387,011 | 6/1968 | Coates et al. | 260—429.7 |
| 3,415,857 | 12/1968 | Hoye et al. | 260—429.7 |
| 3,340,283 | 9/1967 | Gloskey | 260—429.7 |
| 3,446,826 | 5/1969 | Coates et al. | 260—429.7 |
| 3,475,472 | 10/1969 | Suzuki et al. | 260—429.7 |
| 3,519,665 | 7/1970 | Molt et al. | 260—429.7 |

TOBIAS E. LEVOW, Primary Examiner

W. F. W. BELLAMY, Assistant Examiner